United States Patent

Margolis et al.

[11] 4,072,761
[45] Feb. 7, 1978

[54] AROMATIZATION OF COFFEE PRODUCTS

[75] Inventors: Geoffrey Margolis, Marysville; Richard Tien-Szu Liu, Worthington, both of Ohio

[73] Assignee: Societe d'Assistance Technique pour Produits Nestle S.A., Lausanne, Switzerland

[21] Appl. No.: 634,487

[22] Filed: Nov. 24, 1975

[51] Int. Cl.² .............................................. A23F 1/04
[52] U.S. Cl. ........................................ 426/387; 55/87; 261/DIG. 26; 426/564; 426/594
[58] Field of Search ............... 426/564, 386, 387, 594; 55/87; 261/DIG. 26

[56] References Cited

U.S. PATENT DOCUMENTS

| | | | |
|---|---|---|---|
| 1,144,193 | 6/1915 | Haas | 55/87 X |
| 1,894,508 | 1/1933 | Barthelemy | 55/87 X |
| 3,495,988 | 2/1970 | Balassa | 426/594 X |
| 3,535,118 | 10/1970 | Klein et al. | 426/386 |
| 3,717,472 | 2/1973 | Strobel | 426/386 X |
| 3,765,904 | 10/1973 | de Roissart et al. | 426/386 X |
| 3,823,241 | 7/1974 | Patel et al. | 426/386 |
| 3,836,682 | 9/1974 | Yadlowsky | 426/386 X |
| 3,903,312 | 9/1975 | Clinton et al. | 426/386 X |
| 3,917,858 | 11/1975 | Bos | 426/594 |
| 3,939,291 | 2/1976 | Katz | 426/388 X |

Primary Examiner—Frank W. Lutter
Assistant Examiner—Frank Sever
Attorney, Agent, or Firm—Watson, Leavenworth, Kelton & Taggart

[57] ABSTRACT

Coffee aroma gas is admixed with an absorbent comprising aqueous liquid and liquid edible oil under pressure to produce a foam. This foam may then be contacted with soluble coffee solids to effect their aromatization.

14 Claims, 1 Drawing Figure

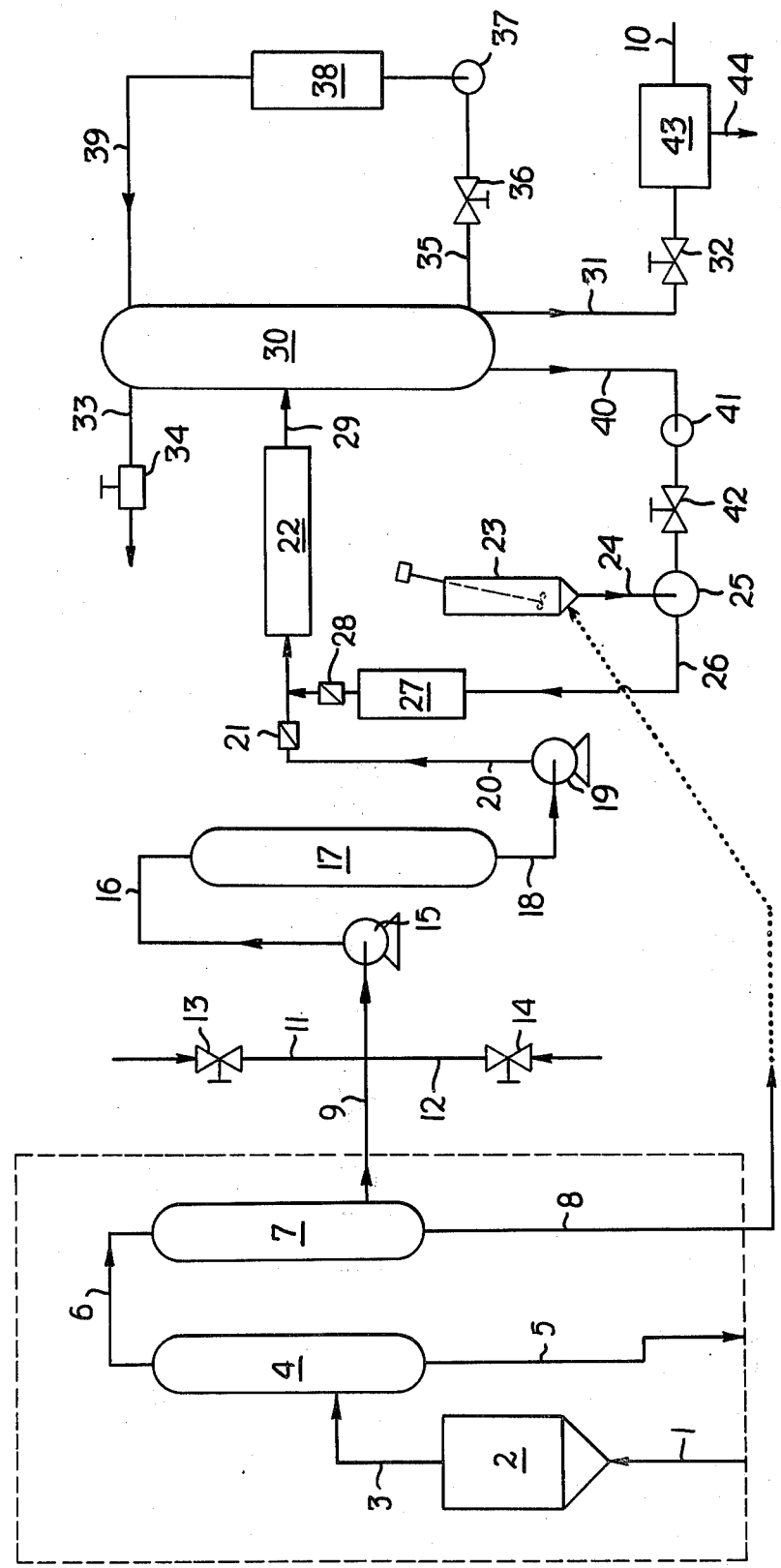

AROMATIZATION OF COFFEE PRODUCTS

BACKGROUND OF THE INVENTION

During the manufacture of instant coffee products from green beans, many aroma and flavor vapors of coffee are produced. Some of these vapors are produced during the roasting and/or grinding of coffee beans. Others are produced upon contact of the roast ground coffee with water as, for example, in the production of aqueous extract. Still other vapors are given off where the aqueous extract is concentrated, as by vacuum evaporation, and under certain conditions of drying, such as spray drying.

Because these vapors are essential for the aroma and flavor of naturally brewed coffee, it is conventional to attempt to collect and reincorporate at least a portion of them into dry instant coffee products. These vapors and many of the means for their recovery are described in the two volumes of *Coffee Processing Technology* by Sivetz et al., AVI Publishing Company, Inc. (1963), particularly Chapter 14.

These prior art techniques have not, however, been completely successful. Many require apparatus or conditions which have not proven feasible for commercialization. Others do not permit recovery of all vapors important to aroma and flavor. This accounts, in part, for the lower and less complete aroma ordinarily associated with instant, as opposed to freshly brewed, coffee beverage.

INTRODUCTION TO THE INVENTION

It is an object of this invention to provide a simple means for recovering the aroma and flavor vapors of coffee ordinarily produced during the production of powdered soluble coffee products.

It is also an object of this invention to provide a means of stabilizing these vapors so that they can be utilized for aroma enhancement.

Another object of this invention is to provide a means for incorporating these aroma and flavor vapors into soluble coffee solids to produce an improved coffee product.

A still further object of this invention is a means for incorporating a more complete spectrum of the various coffee vapors into a dry coffee product in order to provide an enhanced and more full-bodied coffee flavor and aroma.

These, and other objects and advantages as are described in the following specification, are achieved through the present invention.

DESCRIPTION OF THE INVENTION

The vapors responsible for coffee aroma and flavor may be considered to be divided into two general classes, based upon their degrees of volatility. One class is already customarily recovered and reincorporated into coffee beverage products. This class comprises volatiles which are readily condensible from gaseous form by means of adjustment of temperature to provide relatively stable liquids.

"Condensible volatiles", as utilized herein, means this class of organic coffee flavor vapors and is defined herein as including those vapor constituents which can be liquified at 1 atmosphere of pressure and a temperature of 0° C. More preferably, this term denominates those volatiles which may be liquified at 1 atmosphere and 15° C. These aroma and flavor volatiles are readily separable and recoverable in the ordinary processing of coffee and have a sufficiently low vapor pressure to permit their incorporation in a dry coffee beverage product without need to ensure their stability.

The remaining class of coffee vapors encompasses the "non-condensible volatiles" of coffee. These more volatile constituents of the vapor are the coffee volatiles which do not liquify under the foregoing conditions of temperature and pressure. Indeed, a substantial proportion of these volatiles cannot be liquified at even substantially lower conditions of, for example, 1 atmosphere and −100° C.

These non-condensible volatiles represent only a very small fraction of the valuable coffee components. Thus, although most may be obtained by steam stripping roast coffee, this technique results in the evolution of only about 0.1 to 0.4% of gas by weight of coffee (of which over 90% is usually carbon dioxide). Their low concentration, however, is counter-balanced by their very intense coffee aroma.

This invention relates to a method for making coffee products of improved flavor and aroma. In particular, it involves the recovery of coffee vapors, particularly the non-condensible volatiles of coffee, and their incorporation into coffee products to provide a more natural coffee aroma.

In accordance with the present invention, these non-condensible volatiles of coffee may be collected and then added to soluble coffee solids by a technique which substantially preserves their complete spectrum of constituents. Further, prior to addition to the soluble coffee solids, these non-condensible volatiles are treated to substantially increase their stability.

The preservation of these non-condensible volatiles is accomplished by admixing an aroma gas with a liquid absorbent under high pressure and with sufficient agitation to produce a foam. The foaming results in a condition which permits rapid transfer of the non-condensible volatiles from the aroma gas into the stabilizing absorbent.

Because of their high volatility at even lower temperatures, these non-condensibles are present in most of the vapors given off during processing of coffee. Their concentrations, however, are generally higher in the vapors produced in the initial processing steps of roasting, grinding and stripping coffee. Non-condensible volatiles may therefore readily be collected simply by trapping the vapors from one or more of these sources.

These trapped vapors may also include the previously described condensible volatiles, the recovery of which for aromatization is readily performed by means known in the art. It is therefore preferred to remove these condensible volatiles (as well as any other constituents such as steam which readily liquify) to reduce the amount of gaseous material to be processed in accordance with this invention. This may be performed by cooling the vapors to about 0° to 15° C. The remaining vapors constitute an aroma gas composed essentially of carbon dioxide and non-condensible volatiles.

Aroma and flavor vapors stripped from roast ground coffee with a gas, preferably steam, are a source of aroma gas particularly high in non-condensible volatiles. This aroma gas may be collected by, for example, means described in U.S. Pat. No. 3,148,070 of Abraham R. Mishkin et al. This patent, the disclosure of which is incorporated herein by reference as if it were set forth at length, effects condensation of the vapors-laden stripping gas in at least two stages. In the first, the gas in cooled only partially. This permits essentially selective condensation of much of the steam. The vapors-laden gas is then cooled further in another condenser to liquify most of the remaining vapors into a concentrated aqueous distillate which may be combined with soluble coffee solids for enhancement of flavor and aroma. The gaseous vapors remaining after separation of the distillate comprise a preferred aroma gas.

The aroma gas and liquid adsorbent may be admixed and foamed in virtually any proportions. Because the aroma gas ordinarily contains only a small amount of non-condensible volatiles, low ratios of gas to liquid usually result in low degrees of aromatization. A similar result is obtained with high ratios of gas to liquid, because of reduced transfer of the non-condensible volatiles to the absorbent. An aroma gas to liquid absorbent ratio of from about 1:2 to 1:50, more desirably 1:4 to 1:25, by weight is therefore preferred.

The temperature of the aroma gas and the liquid absorbent during admixture has been found to affect the efficiency of transfer of non-condensible volatiles from the absorbent. In general, lower temperatures promote this transfer. Unfortunately, however, good foam production cannot be achieved at very low temperatures. Admixture is therefore preferably performed at a temperature between 5° and 40° C, most preferably between 8° and 16° C. In order to ensure these conditions, it is further preferred that the aroma gas and/or particularly the liquid absorbent have been brought to within the foregoing range, prior to their admixture.

The aroma gas should have a pressure of at least 5 kg/cm$^2$. The aroma gas may be brought to this pressure during the admixing operation itself. Ordinarily, however, compression is performed prior to admixture. Thus, for example, the aroma gas may be pressurized in a conventional compressor or series of compressors before its introduction into an appropriate mixing zone.

This minimum pressure of 5 kg/cm$^2$ is required in order to ensure adequate transfer of the dilute non-condensible volatiles of the aroma gas into the liquid absorbent. Under preferred conditions of operation, a pressure of from about 7 to 15 kg/cm$^2$ is utilized inasmuch as this range ensures an extremely efficient transfer of non-condensible volatiles into the absorbent.

Merely injecting the aroma gas into the liquid absorbent does not result in any meaningful absorption of non-condensible volatiles because the gas simply bubbles through, and separates from, the liquid before transfer can occur. This admixture should be performed under conditions of high turbulence sufficient to produce a foam. Suitable apparatus for this mixing operation are readily available in the art. Preferred, however, is a static mixer. Such an apparatus readily foams the liquid absorbent in seconds.

The liquid absorbent utilized for stabilization of the non-condensible volatiles of the aroma gas should contain both an aqueous liquid and a liquid edible oil. It has been discovered that where only one or the other of these two liquids is employed, there occurs a selective absorption of these non-condensible volatiles more readily soluble in the employed liquid. Such selectivity may actually result in a disagreeable odor. Thus, for example, where only an oil is employed as the liquid absorbent a strongly sulfurous aroma often obtains. Because oil and water have radically different absorption and dissolution properties, however, a full spectrum of the non-condensible volatiles may be preserved through their joint use.

In a preferred embodiment, the aqueous liquid and liquid edible oil are emulsified prior to admixture with the aroma gas. Emulsification is desirably performed immediately prior to introduction of the liquid absorbent into the mixing zone. Pre-emulsification is not required, however, inasmuch as the severe turbulence required for the production of a foam can itself be utilized for formation of the aqueous/oil emulsion.

The liquid edible oil and aqueous liquid comprising the absorbent may be present in widely variant proportions without loss of their compensating and additive properties. Ordinarily, however, the aqueous and oil liquids are provided in a ratio of from about 3:1 to 1:5, respectively, most preferably from about 1:1 to 1:2 by weight.

The edible liquid oils which may be utilized as a portion of the stabilizing absorbent include the animal and vegetable oils and fats which are liquid under the conditions of admixture and foaming. Preferably, these oils are neutral in aroma and taste and have a storage stability which is at least equal to that of the dry coffee solubles with which they are eventually combined.

Exemplary of these oils are those customarily employed for incorporation of condensible volatiles into coffee products. Preferably, however, the oil actually utilized is a coffee oil inasmuch as this is a naturally occurring constituent of the coffee.

The essential constituent of the other component of the liquid absorbent is water. Water provides the desired solubilization and/or absorption characteristics necessary—in combination with the liquid edible oil—to recover the full spectrum of non-condensible volatiles.

Ordinarily, however, the aqueous liquid is a solution or slurry containing additional ingredients. In, for example, a preferred embodiment of this invention, the aqueous liquid comprises the distillate produced by condensing the steam stripped volatiles of roast coffee. Such a distillate comprises an aqueous solution of the condensible volatiles of coffee. Thus in this embodiment, the aroma-emulsion foam provides a means for simultaneously adding both the condensible and non-condensible volatiles to soluble coffee solids.

In another preferred embodiment of this invention, the aqueous liquid includes an encapsulating agent which will still further stabilize the coffee volatiles. Many encapsulating agents are known in the art for use with condensible volatiles. They include, for example, edible materials such as gum acacia, sodium alginate, gelatin, soluble starch and admixtures thereof. Preferred as an encapsulating agent, however, are coffee solubles themselves. Thus, an aqueous liquid containing dissolved, non-volatile coffee soluble solids may be utilized as an encapsulating agent for the aroma volatiles to avoid introducing any foreign constituents into the eventual coffee product.

Upon admixture as set forth hereinabove, the aroma gas, aqueous liquid and liquid edible oil are transformed into an aroma-emulsion foam. It is this production of foam which is largely responsible for the desired transfer of non-condensible volatiles from the aroma gas into the preservative absorbent. This foam results in the production of an extremely large liquid surface area through which absorption from the aroma gas may take place. In addition, it may entrap a proportion—ordinarily from about 3 to 10%—of the aroma gas. This still further improves the efficiency of absorption of the available non-condensible volatiles.

One means by which this process may be controlled is by monitoring the density of the aromaemulsion foam. Because the liquid absorbent ordinarily has a density of about 1 g/cc, any decrease in density achieved by incorporation of aroma gas reflects the degree of foaming. Desirable foams have a density, at a pressure of 760 mm of Hg and a temperature of 10° C, of less than 0.8 g/cc. Still lower densities indicate improved admixture resulting in conditions conducive to more efficient and complete absorption of the non-condensible volatiles. Consequently foam densities between about 0.15 to 0.6 g/cc, more desirably 0.35 to 0.45 g/cc, (at a pressure of 760 mm of Hg and a temperature of 10° C) are preferred.

Foams produced in accordance with this invention have been found to be extremely stable. Despite the fact that they are initially produced with compressed gas, they can ordinarily be removed to ambient conditions of about 760 mm of Hg without loss of their foam character.

To monitor the process, a sample of foam can be removed from its pressurized environment for density measurement. Then, if a lower density is desired, it can simply be further admixed. In addition, because the foam will expand as the pressure is reduced, the size of entrapped gas pores becomes more evident. If the foam remains stable under atmospheric conditions, optimum conditions for non-condensible volatiles transfer are ensured.

Once the desired degree of foaming has occurred, the aroma-emulsion may be applied to soluble coffee solids for aromatization. Ordinarily, the aroma-emulsion is added to the solids in an amount sufficient to impart from about 0.2 to 1%, preferably from 0.4 to 0.6%, by weight of oil to the product. Such addition provides a desirable degree of aromatization without incorporating sufficient oil —which is essentially water-insoluble—as to provide an undesirable appearance in the reconstituted beverage.

Incorporation may be accomplished simply by contacting the aroma-emulsion and soluble coffee solids. These non-volatile solids are obtained by extracting roast ground coffee with water in conventional manner. Thus the aroma-extract can be added to aqueous coffee extract which would then ordinarily be dried to particulate form. Preferably, however, it is already dried, soluble coffee solids which are aromatized. Because the dry solids are essentially anhydrous, the moisture content of the emulsion is quickly absorbed and the oil content plated onto the individual soluble solids particles, while the aroma remains in stabilized condition.

DESCRIPTION OF THE DRAWINGS

The flow scheme in the attached drawing illustrates the present process in combination with its preferred embodiment of conjunctive use of steam stripping for the recovery of condensible volatiles of coffee.

In the drawing, the zone delineated by the dashed lines ( — — — ) comprises a conventional stripping and recovering sequence such as that set forth in the aforementioned U.S. Pat. No. 3,148,070 of Mishkin et al.

This stripping and recovering is performed by injecting steam through a line 1 into a percolator 2 containing fresh roast ground coffee. The high temperature of the steam (normally from about 100° to 150° C) vaporizes and entrains the coffee aroma and flavor volatiles, which are passed through a line 3 to a first condenser 4 maintained at a temperature of from about 75° to 95° C by, for example, an indirect heat exchange jacket (not shown). In this first condenser, much—ordinarily from about 60 to 96% by weight—of the steam is condensed to liquid which is removed through a line 5.

The remaining gas, which consists essentially of aroma and flavor volatiles in combination with carbon dioxide (produced upon contact of the roast ground coffee with steam) is passed through a line 6 to a second, similar condenser 7. The second condenser is maintained at a substantially lower temperature, ordinarily from about 0° to 15° C. There the condensible volatiles of coffee are liquified and may be removed through a line 8.

In a preferred embodiment, this aqueous distillate of condensible volatiles is subsequently utilized as the aqueous liquid component of the liquid absorbent. Consequently, it is then introduced into a mixing chamber 23 for emulsification with the liquid edible oil as shown by the dotted ( . . . ) extension of line 8. Alternatively, it may be separately incorporated into the eventual coffee product by conventional means.

Even the colder conditions of condensation in the second condenser 7 do not, however, liquify all of the stripped aroma gas. This remaining aroma gas is therefore removed from the condenser through a line 9. In accordance with the prior art, this line 9 would normally vent to the atmosphere causing a loss of these non-volatiles. In this invention, however, this aroma gas comprising non-condensible volatiles is passed into a collection reservoir 17 through a line 15. The aroma gas in the reservoir may be maintained under a pressure of from about 5 to 30 kg/cm$^2$ by compressor 15. Preferably, it may be maintained under atmosphere or other pressure, removed from the reservoir 17 through a line 18 and only subsequently pressurized utilizing a compressor 19.

In addition to the non-condensible volatiles obtained from stripping, volatiles from other sources may be added to the aroma gas. Thus, lines 11 and 12 having valves 13 and 14, are provided for collecting grinder gas, gas generated during aqueous extraction of the roast coffee, roaster gas and the like.

The pressurized aroma gas is passed through line 20 past a one-way gate 21 and into a mixer 22 which is preferably a static, in-line mixer. In this mixer, the aroma gas is foamed with an emulsion of aqueous liquid and liquid edible oil produced in a mixing chamber 23. The emulsion is passed through a line 24 into a pump 25. The emulsion then passes through line 26 to a heat exchange column 27, utilized to bring the emulsion to the preferred temperature of contacting of between 5° and 40° C. It is then passed through another one-way gate 28 into the mixer 22 where, in combination with the pressurized aroma gas, an aroma-emulsion foam is produced.

This foam exits the mixer 22 through a line 29 and is collected in a receiver 30. Through a line 33 and a pressure controller 34, excess gas not retained within the foam may be vented.

Aromatization is performed by removing the aroma-emulsion from receiver 30 through a line 31 controlled by one-way valve 32. The aroma-emulsion is introduced into a chamber 43 where it contacts soluble coffee solids arriving through a line 10. In the contacting chamber 43, the solubles—preferably in dry particulate form—contact the aroma-emulsion. This contact ordinarily occurs at a pressure of about 1 atmosphere and temperature of between about 5° to 40° C. After mere seconds, the aromatized product may then be removed through a line 44.

In an optional embodiment, the foam may be constantly admixed by removal from the bottom of reservoir 30 through line 35, controlled by one-way valve 36. It is then forced through a mixer 38 by pump 37 and then returned to the top of receiver 30 through line 39. Such additional mixing of the foam after its production is desirable because the specific constituents making up the coffee volatiles are not uniformly volatilized throughout the processing of the coffee. Concentrations of these constituents in the aroma gas or steam stripping distillate may vary depending upon the time of their removal during the coffee processing sequence. This further admixture of the foam of the receiver 30, therefore permits the production of more uniform aroma-emulsion and thus ensures the incorporation of a full and natural spectrum of volatiles in the eventual coffee product.

In another optional embodiment, the aroma emulsion collected in receiver 30 may be removed by means of a line 40 controlled by valve 42 and pump 41 for incorporation into the liquid absorbent. This permits recycling the liquid absorbent for further contact with aroma gas so as to increase the volatiles concentration in the aroma-emulsion to be used for aromatization of soluble coffee solids.

EXAMPLE 1

A percolator cell containing 430 kg of freshly roast ground coffee is stripped with steam having a temperature of 120° C and pressure of 2 kg/cm$^2$. The gaseous steam laden with coffee vapors is fed into a jacketed condenser maintained at 90° C, where most of the water is liquified and separated. The remaining vapors are then fed into a second condenser jacket to maintain a temperature of 4° C. In this condenser, the condensible volatiles are liquified as a distillate leaving an aroma gas consisting essentially of non-condensible volatiles in carbon dioxide.

Steam stripping lasts 15 minutes. During this time, 33.5 kg of liquid is formed in the first condenser while 5.5 kg of distillate is separated in the second condenser. The distillate is then added to a mixer and emulsified with 11 kg of coffee oil to produce a liquid absorbent for the non-condensible volatiles in the collected aroma gas.

The aroma gas in the second condenser is removed and compressed to a pressure of 13 kg/cm$^2$ at 20° C. It is then admixed with the pre-formed emulsion of aqueous distillate and coffee oil absorbent in a Kenics static in-line mixer having three segments of 10, 6 and 10 mm diameter tubes. The gas and emulsion are fed into the mixer at rates of 0.09 kg/min and 0.9 kg/min, respectively.

The foam exiting the mixer has a density (at 1 atmosphere and 10° C) of 0.35 g/cm$^3$. It is contacted with spray-dried soluble coffee solids in an amount sufficient to impart 0.6% of oil by solids weight. The resultant solids are thus provided with a strong aroma of fresh roast coffee.

EXAMPLE 2

Grinder gas (the coffee vapors emitted during grinding of roasted coffee beans) is collected in a gas accumulator consisting of a series of expandable plastic bags. After filling the accumulator, this aroma gas is compressed to a pressure of 13 kg/cm$^2$ and cooled to 16° C preparatory to admixture with liquid absorbent.

The absorbent is separately perpared by emulsifying equal weights of water and coffee oil. It is then cooled to a temperature of 16° C.

The emulsion and gas are then fed simultaneously into a Kenics static in-line mixer having three segments of 6, 6 and 10 mm tube diameters. The emulsion is pumped into the mixer at a rate of 0.45 kg/min and the aroma gas, at 0.04 kg/min.

The residence time of emulsion and gas in the mixer is about 1.5 second and results in the production of a stable foam. This foam is fed into the mix-point of a receiver tank maintained at a pressure of 5.2 kg/cm$^2$ and temperature of 10° C. After filling, foam is drawn off from the bottom of the tank to a mixer and then reintroduced to the top of the tank. This recirculation is continued for 10 minutes to thoroughly admix the foam.

After recirculation, aromatization is effected by spraying the foam onto an agitated bed of particulate coffee solids produced by freeze-drying an aqueous extract of coffee. Sufficient foam—which has a density of 0.6 g/cm$^3$ at one atmosphere and 10° C—is added to incorporate 0.52% of oil by weight of coffee solids into the particles. The foam is almost instantly absorbed by the particles.

A comparison of treated and untreated particulate coffee solids shows the result of aromatization. Jars filled with foam-contacted powder possess a strong, natural smell of fresh roasted coffee. Untreated powder, on the other hand, has only a faint odor which, while identifiably coffee-like, is significantly less appealing.

We claim:

1. A process for aromatizing a coffee product comprising:
    a. collecting an aroma gas comprising non-condensible volatiles of coffee;
    b. admixing the aroma gas under a pressure of at least 5 kg/cm$^2$ with a quantity of an absorbent comprising aqueous liquid and liquid edible oil under such conditions as to produce an aroma-emulsion foam; and
    c. contacting said aroma-emulsion foam with soluble coffee solids to incorporate aroma in said soluble coffee solids, said foam functioning to provide substantially more liquid surface area than an equal amount of unfoamed absorbent, thereby to absorb a greater volume of said aroma gas in said quantity, than would be absorbed in said amount under similar conditions.

2. The process of claim 1, wherein the compressed aroma gas, aqueous liquid and liquid edible oil are admixed at a temperature between 5° and 40° C.

3. The process of claim 2, wherein the foam has a density, at a pressure of 760 mm of Hg and temperature of 10° C, of from about 0.25 to 0.6 g/cc.

4. The process of claim 1, wherein the aroma gas is collected by:
    a. passing a stripping gas through roast coffee to remove coffee flavor vapors from the coffee and entrain them in the gas;
    b. chilling the resultant vapors-laden gas to a temperature of from about 0° to 15° C thereby to condense a portion of said gas and liquify certain of the coffee flavor vapors therein; and
    c. separating the condensate from the remainder gas portion whereby said remainder gas portion comprises said aroma gas.

5. The process of claim 4, wherein said stripping gas comprises steam and wherein, prior to chilling to from 0° to 15° C, the vapors-laden gas is cooled to from 75° to 95° C to condense water therefrom.

6. The process of claim 1, wherein the aqueous liquid comprises an aqueous condensate of stripped coffee volatiles.

7. The process of claim 1, wherein the aqueous liquid comprises an aqueous solution of aroma-encapsulating agent.

8. The process of claim 7, wherein the aroma-encapsulating agent comprises non-volatile soluble coffee solids.

9. The process of claim 1, wherein the absorbent comprises aqueous liquid and liquid edible oil in a ratio of from about 3:1 to 1:5.

10. The process of claim 1, wherein the foam has a density, at a pressure of 760 mm of Hg and temperature of 10° C, of less than 0.8 g/cc.

11. The process of claim 1, wherein the aroma gas and liquid absorbent are admixed in a ratio of from 1:2 to 1:50 by weight.

12. The process of claim 1, wherein the amount of aroma-emulsion contacted with soluble coffee solids corresponds to an addition of 0.2 to 1% of liquid edible oil by weight of said solids.

13. The process of claim 1, wherein the liquid edible oil comprises coffee oil.

14. The process of claim 1, wherein the soluble coffee solids are dry, particulate solids.

* * * * *